Sept. 9, 1952 E. T. PLATZ 2,610,272

CIRCUIT BREAKER

Filed Nov. 17, 1948 9 Sheets-Sheet 1

INVENTOR.

Elwood T. Platz

BY

Daniel G. Cullen

Attorney

Sept. 9, 1952 E. T. PLATZ 2,610,272

CIRCUIT BREAKER

Filed Nov. 17, 1948 9 Sheets-Sheet 2

INVENTOR.

Edward T. Platz

BY

Daniel G. Cullen

Attorney

Fig. 3 OFF

INVENTOR.
Elwood T. Platz
BY
Daniel G. Cullen
Attorney

Fig. 4 Tripped

INVENTOR.
Elwood T. Platz
BY
Daniel G. Cullen
Attorney

Sept. 9, 1952 E. T. PLATZ 2,610,272

CIRCUIT BREAKER

Filed Nov. 17, 1948 9 Sheets-Sheet 5

INVENTOR.

Elwood T. Platz

BY

Daniel G. Cullen

Attorney

Sept. 9, 1952 E. T. PLATZ 2,610,272

CIRCUIT BREAKER

Filed Nov. 17, 1948 9 Sheets-Sheet 6

INVENTOR.

Edward T. Platz

BY

Daniel R. Cullen

Attorney

Sept. 9, 1952 E. T. PLATZ 2,610,272

CIRCUIT BREAKER

Filed Nov. 17, 1948 9 Sheets-Sheet 7

INVENTOR.

Elwood T. Platz

BY

Daniel G. Cullen

Attorney

Sept. 9, 1952

E. T. PLATZ 2,610,272

CIRCUIT BREAKER

Filed Nov. 17, 1948

9 Sheets-Sheet 8

INVENTOR.
Elwood T. Platz
BY
Daniel G. Cullen
Attorney

Sept. 9, 1952 E. T. PLATZ 2,610,272

CIRCUIT BREAKER

Filed Nov. 17, 1948 9 Sheets-Sheet 9

INVENTOR.
Elwood T. Platz
BY
Daniel G. Cullen
Attorney

Patented Sept. 9, 1952

2,610,272

UNITED STATES PATENT OFFICE 2,610,272

CIRCUIT BREAKER

Elwood T. Platz, Detroit, Mich., assignor to Bulldog Electric Products Company, Detroit, Mich., a corporation of West Virginia Application November 17, 1948, Serial No. 60,549

10 Claims. (Cl. 200—89)

This application relates to circuit breakers, and discloses two different embodiments of circuit breakers in the drawings appended to the following specification. In one embodiment, shown in Figs. 1–16 of the drawings, there is shown a circuit breaker having three poles, with a magnetic latch trip means. In Figs. 17–18, there is shown a breaker having but one pole, with a bimetal or thermal latch trip means.

For an understanding of the two embodiments herein disclosed, reference should be had to the appended drawings.

In these drawings.

*Figs. 1–16*

These figures show a multipole breaker having magnetic latch release means.

Figure 2:
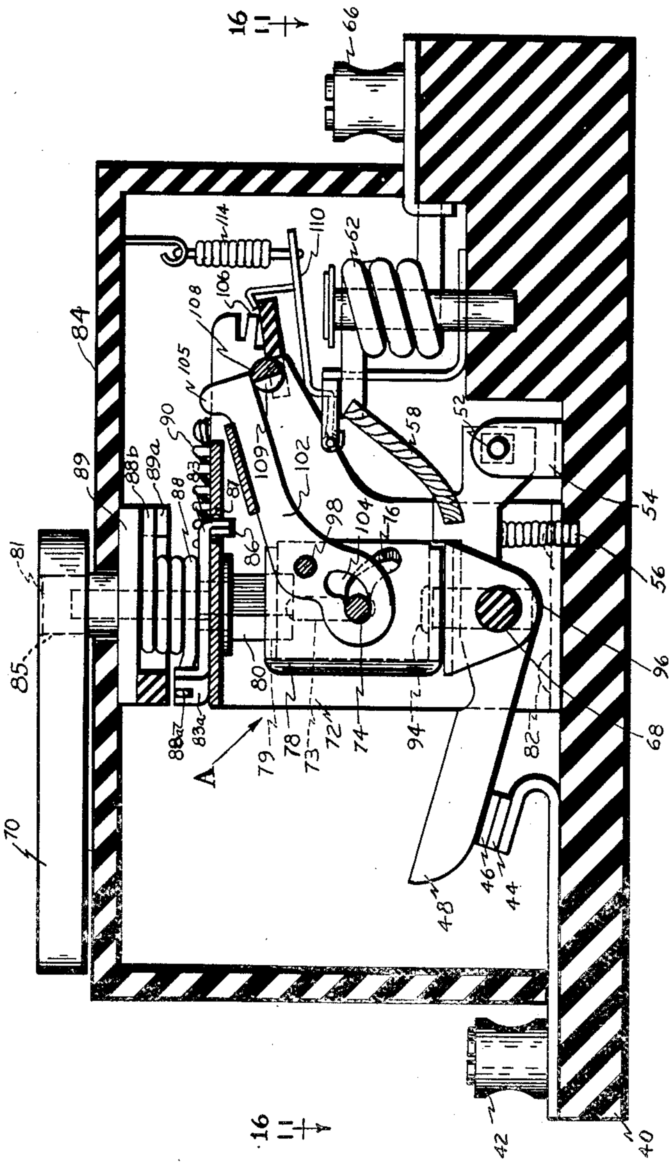
Fig. 2 is a section view as if on line 2—2 of Fig. 1 with the parts shown in the "on" position.
Figure 16:
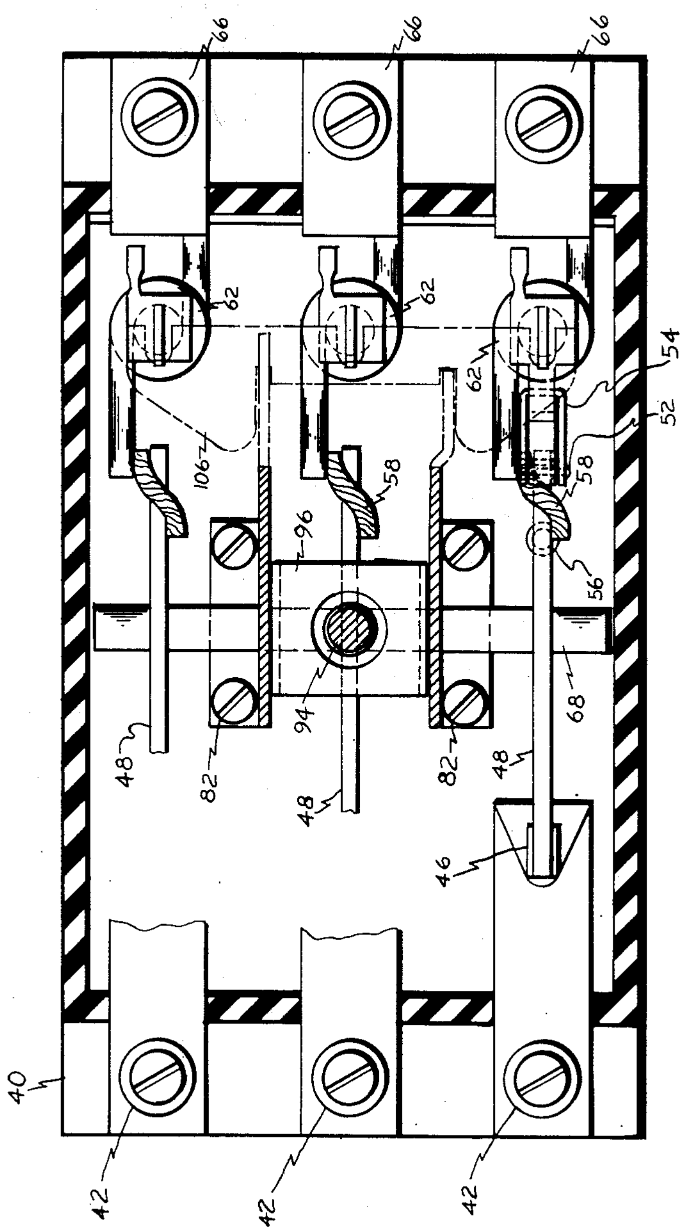
Fig. 16 is a plan section view as if on line 16—16 of Fig. 2.

Fig. 16 shows the breaker as having a base 40 at the left end of which are mounted three line terminal connectors or binding posts 42 connected to stationary contacts 44 adapted to be engaged by contact tips 46, Fig. 2, of three vertically movable contactors 48, Fig. 2, pivotally mounted by means of loose or lost motion pivots 52 on mounting brackets 54 and constantly urged upwardly or clockwise by biasing springs 56 and connected by flexible connectors 58 to three electro-magnet latch release coils 62 connected to three load terminal connectors or binding posts 66.

A transverse axle 68 suitably insulated from them connects the three contactors 48 so they may operate in unison in response to the control arrangement, generally referred to as "A," Fig. 2, which will now be described.

Figure 7:
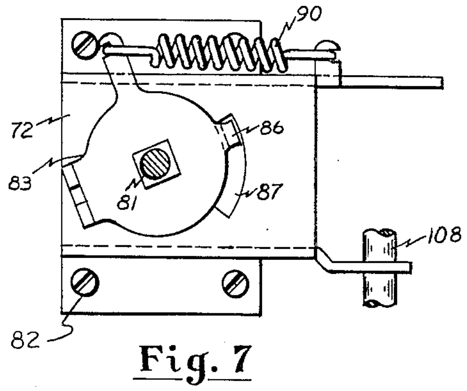
Fig. 7 is a plan view of the parts shown in Fig. 6.
Figure 8:
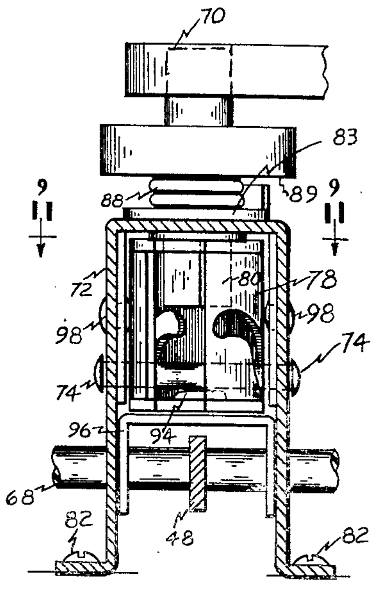
Fig. 8 is a section view as if on line 8—8 of Fig. 6.
Figure 6:
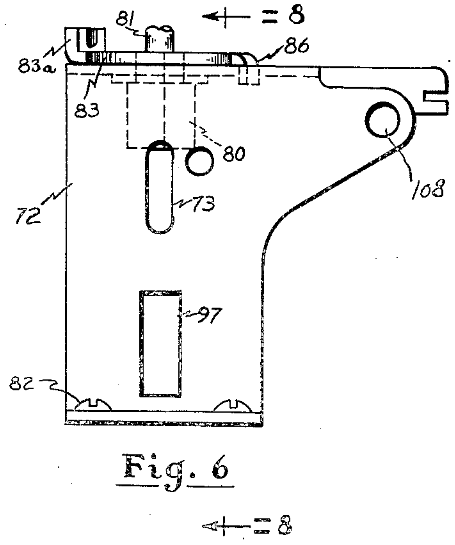
Fig. 6 is an elevation view showing a frame for housing the spirally slotted cylinder; the handle assembly of Fig. 5 is disposed above such frame.

The control arrangement operatively connects the contactors 48 to a horizontally rotating movable handle 70, and includes a U-shaped frame 72, shown best in Figs. 6, 7 and 8, which has on each side a slot 73 in which are vertically movable, horizontal pins 74, best shown in Fig. 8. These may be separate, or preferably integral, as shown, being opposite end portions of a single shaft. Pins 74 pass through spiral slots 76 of a cylinder 78, shown in Figs. 10, 11, 12 and 13. The upper end of cylinder 78 has a squared hole 79 slidably receiving a square shaft 80 having an upper or exposed stub end 81.

Frame 72 is fastened to the base 40 by screws 82 as shown in Figs. 8 and 16.

Figure 5:
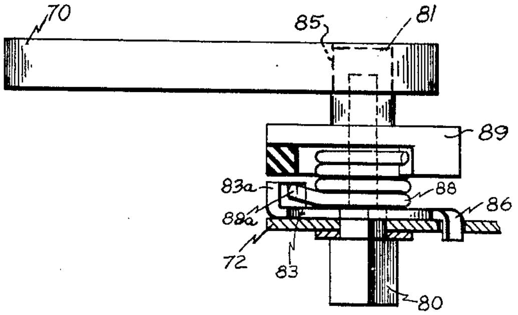
Fig. 5 is a fragmentary elevation view showing the handle, and a squared shaft for connecting the handle to a spirally slotted cylinder.
Figure 19:
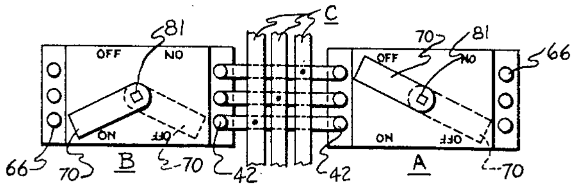
Fig. 19 shows a pair of breakers hereof as if arranged in a panelboard.

Shaft 80 has a horizontal circular disc 83, shown in Figs. 5 and 6, integrally mounted on its upper end and the stub end of shaft 81 projects above said disc through a hole in the rectangular cover 84 of the casing to fit into a squared hole 85 of handle 70 whereby the latter is detachably connectable to stub end 81 of the shaft 80 and may be secured thereto in either of two different positions relative to the shaft 80, as shown in Fig. 19. Circular disc 83 has a lug 86 projecting downwardly into a curved slot 87 cut in the frame 72, as shown in Fig. 6.

Mounted upon circular disc 83 and around shaft 80 is a quick make and break torsion spring 88 having projecting ends 88a and 88b, the lower one 88a of which is held by lug 83a projecting upwardly from circular disc 83 and the upper one of which is engaged by a lug 89a of a disc 89 keyed to squared shaft 80 so as to move with it and the handle 70. Also connected to the horizontal circular disc 83 and to frame 72 is a return spring 90.

Figure 11:
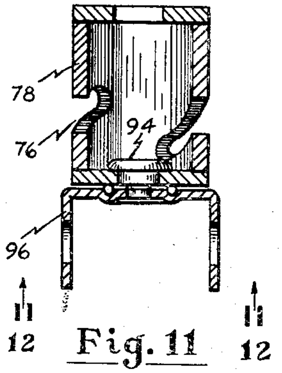
Fig. 11 is a section view as if on line 11—11 of Fig. 10.
Figure 13:
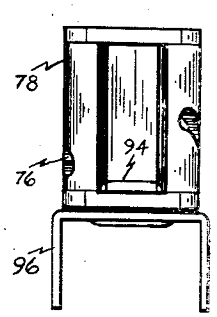
Fig. 13 is a view like Fig. 11 but showing the spirally slotted cylinder rotated on its vertical axis from the position of Fig. 10.
Figure 14:
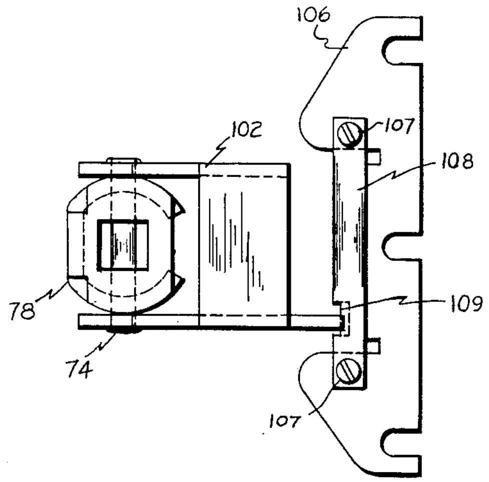
Fig. 14 is a plan view showing the cooperative assembly of the spirally slotted cylinder, a latch therefor, a latching bar, and a trip bar for the latching bar.

At the lower end of cylinder 78 is a loose rivet or shouldered screw 94, Figs. 11 and 13, for joining cylinder 78 to a yoke 96. Thus the yoke and cylinder may move together vertically but cylinder 78 may rotate on a vertical axis free of the yoke. Transversely passing through and thus connected to the three contactors 48 is the axle 68 which connects the ends or the legs of the yoke 96 to the contactors 48. Axle 68 also passes through the slots 97, Fig. 6, in the frame 72.

Figure 9:
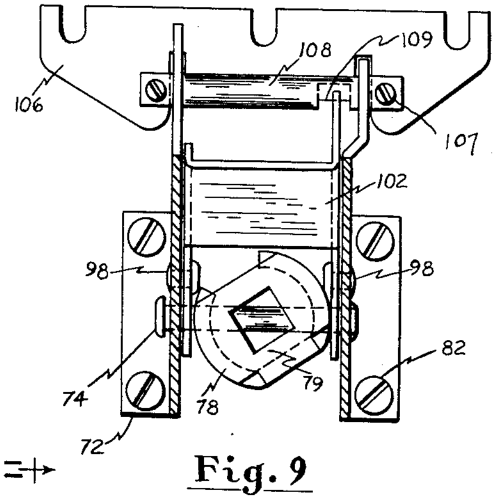
Fig. 9 is a section view taken on line 9—9 of Fig. 8.
Figure 10:
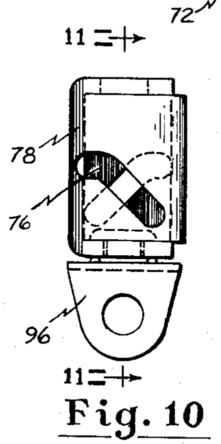
Fig. 10 is an elevation view of the spirally slotted cylinder, showing it connected at its lower end to a yoke in turn connected to an axle for the contactors of the breaker.
Figure 12:
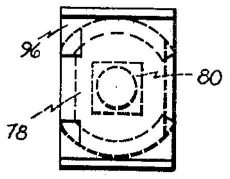
Fig. 12 is a bottom plan view of such cylinder, as if along arrows 12 of Fig. 11.
Figure 15:
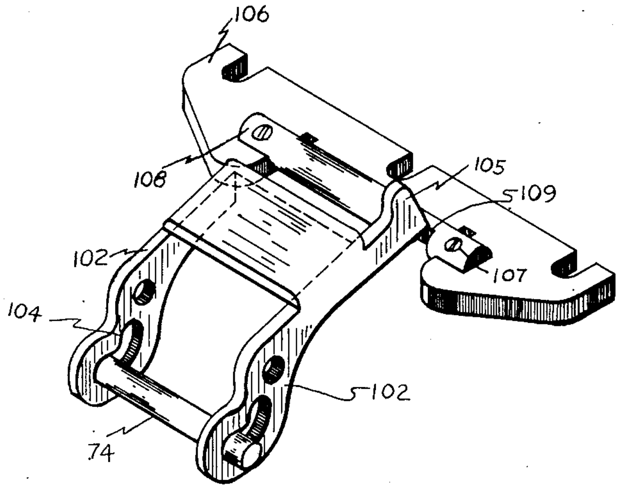
Fig. 15 is a perspective view showing the latch, the latching bar, and the trip bar for the latching bar.

Pivotally mounted on frame 72 by a pin 98 is the latching or holding arm 102, shown best in Figs. 9 and 15. Latch 102 consists of two connected arms having slots 104 to allow passage of horizontal pins 74. These pins 74, therefore, pass through frame 72, latching arms 102, and cylinder 78. One arm of latch 102 has a latching extension 105, whereby latch 102 is releasably latched by latching bar 108 which is journalled at its ends in frame 72, and has immovably fastened to it as by screws 107 a trip bar 106, Figs. 14 and 15. Loosely hooked around the edge of trip bar 106 are three armatures 110, Figs. 2, 3 and 4, of the three magnets 62. Armatures 110 are pivotally mounted in the frame 72 at 112, and are normally biased upwardly by the springs 114. Latching bar 108 has a notch 109 which cooperates with the extension 105 of latch 102 for releasably latching pins 74 and thus the mechanism as a whole.

Latch bar 108 has a spring, not shown, coiled around it tending to keep trip bar 106 in a raised, latch-holding position. When the trip bar 106 and the latch bar 108 are in their upward position, Fig. 2, the latching extension 105 of latch 102 is held upwardly and prevented from moving downwardly by the latch bar 108. In this way latch 102 is held immovable and latch 102 thus holds pins 74 immovable and thus prevents cylinder 78 from moving upwardly unless the handle is moved to rotate such cylinder on its vertical axis, spirally in accordance with the guiding cooperation of the spiral slots 76 and the immovably held pins 74.

However, when any magnet 62 is energized by excessive current it pulls down its armature 110 and rocks the trip bar 106 to rock latch bar 108 clockwise to present notch 109 of bar 108 to the extension 105 of the latch 102, releasing the latter and permitting it to be free to be rocked clockwise. The freed latch 102 no longer holds pins 74 immovable and permits the lifting of these pins 74 and cylinder 78 and the contactors 48 by springs 56, without the cylinder 78 and the handle being required to rotate. This is a trip free action.

*The circuit*

The circuit from connectors 42 to binding posts 66 includes the parts 42—44—46—48—58—62—66.

*Operation*

A. When the parts are in the "on" or closed circuit position, as shown in Fig. 2, and with the latch 102 releasably held by latch bar 108, the pins 74 rest in the upper portions of the spiral slots 76 of the cylinder 78. The parts are held stable in the "on" position since the pins 74 are held by the left ends of the slots 104 of the latch 102, despite the bias of the springs 56 tending to move the contactors 48, axle 68, yoke 96, pins 74 and cylinder 78 upwardly along the squared shaft 80 of the handle 70. Latch 102 which is then held by latch bar 108, prevents vertical movement of pins 74. Pins 74 rest in the upper and horizontal portions of spiral slots 76 of cylinder 78, preventing cylinder 78 from rotating and moving upwardly when the parts are in the circuit closed position, and thus preventing the parts from moving out of the circuit closed position.

Since, for upward movement of the contactors 48, the cylinder 78 must move upwardly, and since the cylinder 78 is held against such movement, the contactors 48 are held in the circuit closed position, against the bias of springs 56 which bias them to the open circuit position.

Figure 1:
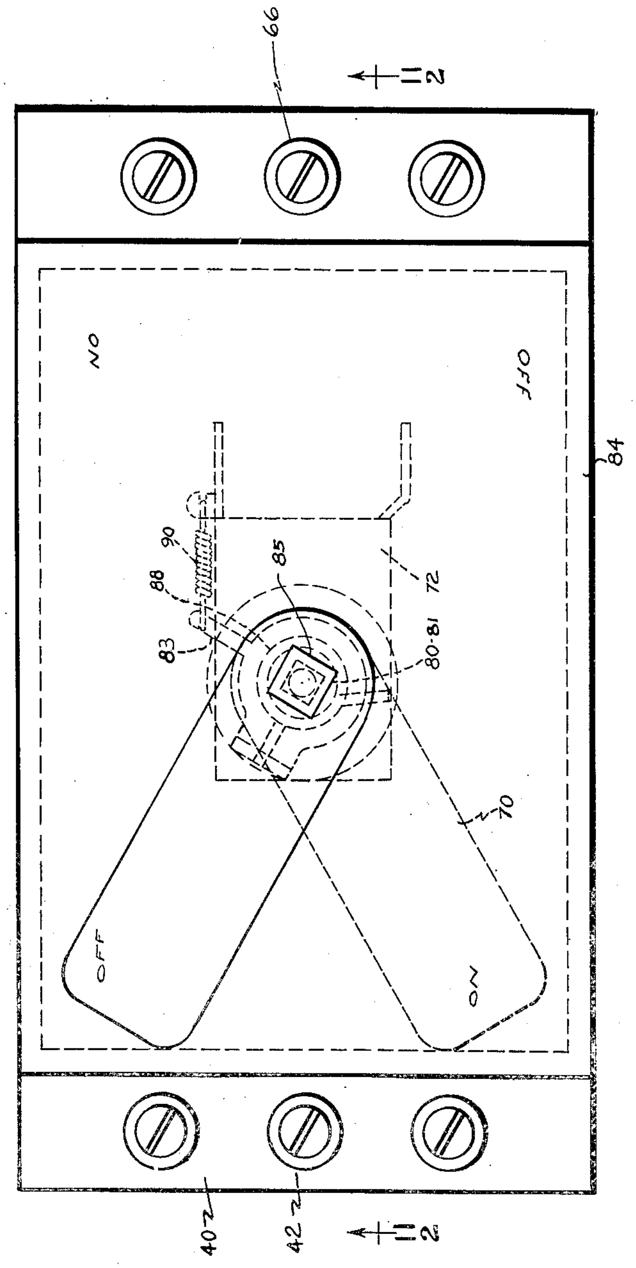
Fig. 1 is a top plan view of the three pole, magnetic trip embodiment with its actuator or handle shown in the "off" position in full lines and in the "on" position in dotted lines.

B. When the handle is rotated clockwise, as shown in Fig. 1, to the "off" position, the connection between it and the cylinder 78 established through torsion spring 88, horizontal circular disc 83, and shaft 80, causes cylinder 78 to rotate with a quick break action, and thus to cause spiral slots 76 to ride up horizontal pins 74 and move cylinder 78 upwardly. Springs 56 will cooperate to lift the contactors, the axle, the yoke and the cylinder, and the circuit will be opened.

Horizontal pins 74 cannot move upwardly since they are held by latch 102 which is releasably held by bar 108. Pins 74, therefore, act as bearings for the rotation and upward movement of the slotted cylinder 78.

When the handle is returned to the "on" position from the "off" position, cylinder 78 rotates and moves downwardly to move contactors 48 back to engagement with the stationary contacts 44 and close the circuit, with a quick make action.

C. In the event of an overload in any pole, with the parts in the closed circuit position, the magnet 62 of the overloaded pole will be energized to move its armature 110 down and thus move the common trip bar 106 down to rotate latch bar 108 clockwise so that notch 109 of the latch bar 108 is presented to extension 105 of latch 102. Latch 102 is now free to pivot about its pivot point 98 on frame 72. Springs 56 move contactors 48, yoke 96, pins 74 and cylinder 78 upwardly. Cylinder 78 need not now rotate as it slides upwardly on squared shaft 80; instead it carries horizontal pins 74 up with it. Horizontal pins 74 slide up in vertical slots 73 of frame 72, Fig. 7. Upward and circuit opening movement of the contactors 48, the axle 68, the yoke 96, pins 74 and cylinder 78 thus takes place.

*Trip free*

In the event the handle 70 is held against rotation during the overload release movement, the fact that the latch 102 has been freed from the latch bar 108 by the movement of the armatures 110 may be recognized as permitting upward movement of the horizontal pins 74 and, therefore, of the spiral slotted cylinder 78 and the contactors 48 as well, to open the circuit. No rotation of spirally slotted cylinder 78 need take place, nor need the handle rotate.

*Automatic relatching*

Figure 3:
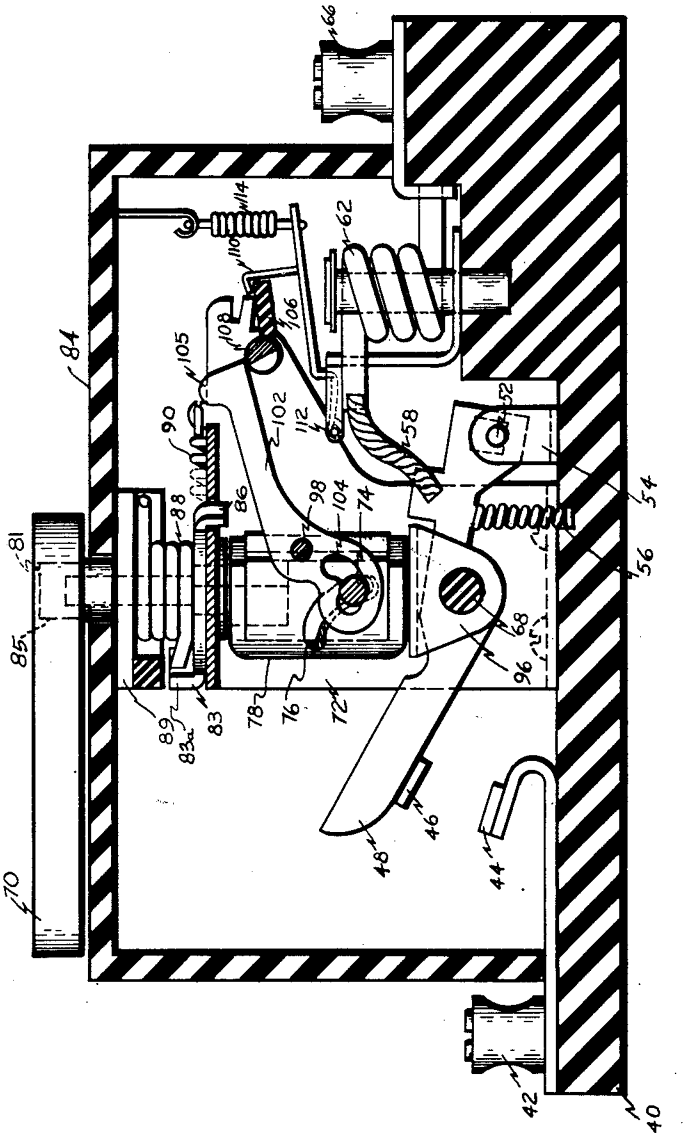
Figs. 3 and 4 are views similar to Fig. 2 but with the parts shown in the "off" and "tripped" positions respectively.
Figure 4:
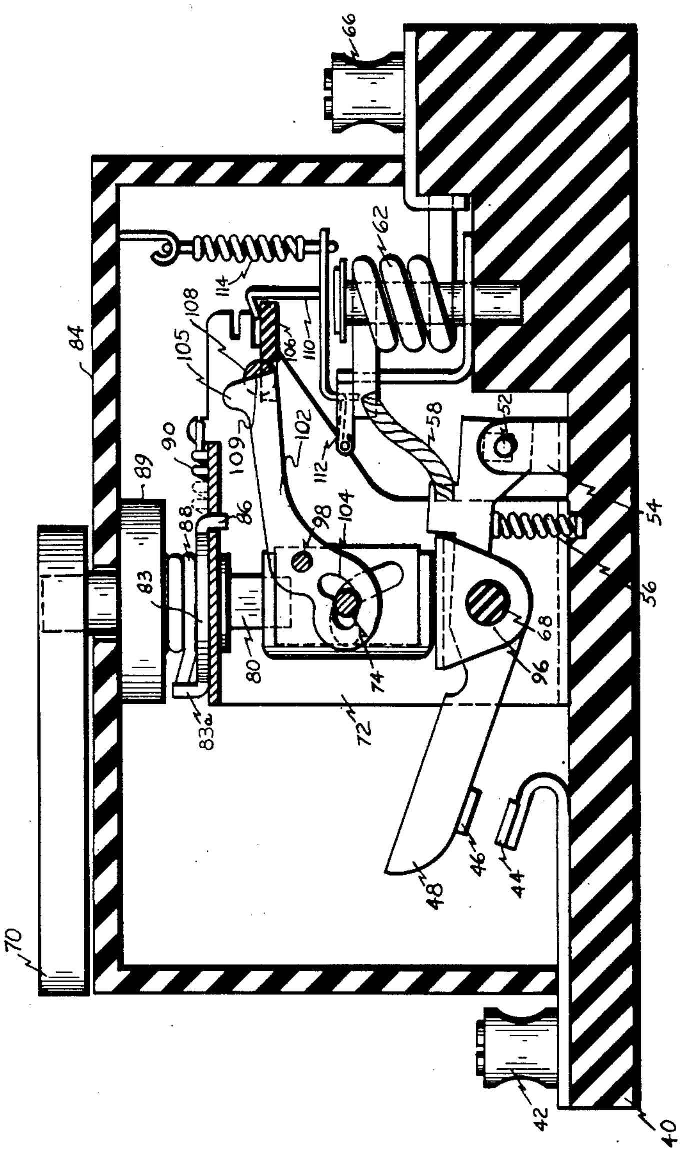

During overload opening, the handle return spring 90 turns cylinder 78 to the left from Fig. 4 so that the upper edges of slots 76 engage pins 74 and cam them down in frame slots 73 to rock latch 102 counter-clockwise to move its latching extension 105 up above bar 108, for automatic relatching. Meanwhile, the deenergized electromagnets 62 have allowed the armatures 110 to be moved upwardly by springs 114 and release trip bar 106 to be raised by the coil spring on bar 108, not shown. The coil spring rotates trip bar 106 and latch bar 108 so that the latch at 105—109 is reestablished. The rotary movement of cylinder 78 rotates shaft 80, parts 83, 88 and 89, and handle 70 together, as a unit, and the movement terminates with all parts in the open circuit position of Fig. 3 and with latch 102 releasably relatched by bar 108. The handle 70 has moved from the "on" to the "off" position due to the influence of the handle return spring 90, and without stressing spring 88. All the parts are now in the "off" position.

It will thus be seen that cylinder 78 forms a part of the handle-contactor assembly, being connected at its upper end to the handle, and at its lower end to the contactor, and that the horizontal pins 74, which are releasably held by the latch 102, cooperate with the cylinder 78 to form a control arrangement for connecting the latch 102 and the handle-contactor assembly.

It will also be observed that when the latch 102 is held by the bar 108, axial or longitudinal motion of the cylinder 78 must be accompanied by rotary motion of the cylinder 78. However, when latch 102 is released, axial or longitudinal motion of the cylinder 78 is permitted without accompanying rotary motion of the cylinder 78.

It will also be noted that the contactors 48 connected to the yoke 96 and, therefore, to the cylinder 78, are moved for contact separation when cylinder 78 is moved vertically, either by actuation by the handle or upon release of the horizontal pins 74 and such motion of the contactors 48 is caused by the biasing springs 56.

It will also be observed that in the circuit breaker hereof, the handle 70 and the contactors 48 are operatively connected through a quick make and break arrangement "A" whereby snap or quick make and break action of the contactors is obtained by handle movement, and wherein there is a means 90 for automatically and simultaneously relatching the breaker at 108—109 and moving the handle 70 to an open circuit position from Fig. 4 to Fig. 3 in the event an automatic overload, accompanied by release of a latch, takes place while the handle 70 is in the circuit closed position of Fig. 2.

Figure 17:
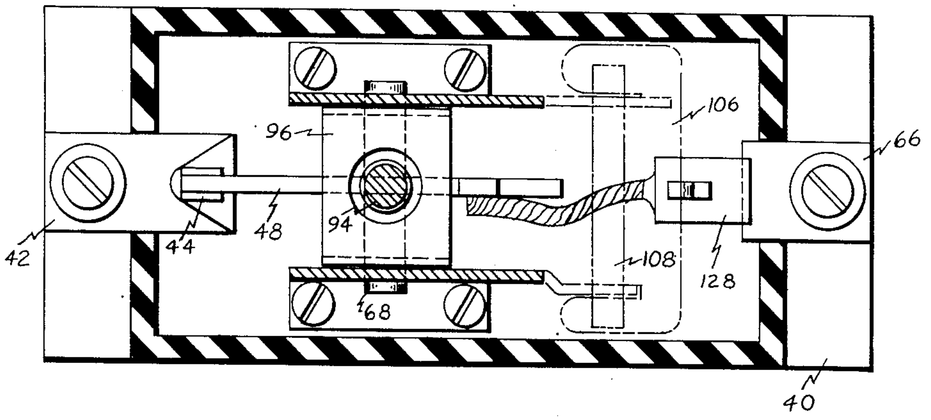
Fig. 17 is a view like Fig. 16 differing therefrom however, in that it shows a single pole breaker, having a bimetal or thermal latch release means, instead of the multiple breaker and magnetic release means of Fig. 16.
Figure 18:
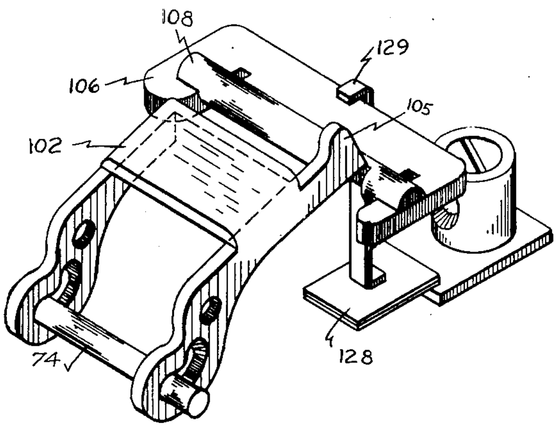
Fig. 18 shows the single pole bimetal or thermal release means.

*Figs. 17–18*

Although Figs. 1–16 show the circuit breaker in a three-pole embodiment, it is to be understood that it could just as easily have been adapted to a single-pole embodiment. To do this, it would merely require shortening of the axle 68, as clearly shown in Fig. 17. The function of the breaker and the operation of the control arrangement would be exactly the same whether the breaker is a single pole or three pole embodiment.

It will also be understood that the means for holding and releasing the latch 102 could be either electro-magnetic, as shown in Figs. 1–16, inclusive, or thermal or bimetal, as shown in Figs. 17 and 18. Trip bar 106 which is normally urged upwardly by a coil spring, not shown, cooperates with a thermal bimetal strip 128, Figs. 17 and 18, having a hook 129 thereon. In the event of an overload, thermal bimetal strip 128 will warp downwardly and will move the trip bar 106 downwardly. Bar 108 which is joined to the trip bar 106 will be rotated clockwise and in so rotating present its notch 109 to the latch 102. Latch 102 being freed will allow the cylinder 78 and the contactor 48 to move upwardly and open the circuit.

*Fig. 19*

Fig. 19 illustrates the importance of the detachable connection at 81—85 between the handle 70 and the shaft 80 which permits the handle to be shifted with respect to such shaft so as to occupy either one of two different positions with respect to the shaft and to the line and load terminal connectors 42—66.

Fig. 19 shows breakers "A" and "B" arranged in a pair as if in a panel board on opposite sides of the center bus bars "C" to which the line connectors 42 are connected. Breaker "A" is arranged with a handle 70 projecting towards the line connectors 42, as in Fig. 1 hereof. Consequently it is possible to obtain circuit opening operation by an up movement of the handle 70 and circuit closing operation by a down movement. Now if the breaker "B" were identical with breaker "A" as to relation of handle and shaft, the handle would be in the dotted line position for breaker "B" and the up movement of the handle would cause circuit closing and the down movement would cause circuit opening. Since it is desirable that for all breakers in a panel, whether they be left or right of the center bus bars, that the same linear movement of the handle accomplish the identical specific operation, the handle 70 of the breaker "B" is shown as having been removed from the shaft and shifted with respect to it and with respect to the line connectors 42 so as to occupy the full line position on breaker "B." Thus up movement of the handle of either breaker "A" or "B" will cause circuit opening and down movement will cause circuit closing.

Here we have illustrated both breakers arranged with the handles moving up for circuit opening and down for circuit closing. If, as is sometimes desired, one wishes to arrange both handles to move up for circuit closing and down for circuit opening, then both handles of breakers "A" and "B" may be shifted with respect to their shafts to the dotted line positions shown so that both handles may be moved up for circuit closing and down for circuit opening.

Either arrangement is possible and either is an illustration of the value of detachably connecting the handle to the shaft and forming the connection in such a way that a handle may be shifted with respect to its shaft and to the line connections 42.

Now having described the circuit breakers herein disclosed, reference should be had to the claims which follow for a determination of the invention.

I claim:

1. In a circuit breaker having a contactor arranged for vertical movement and an actuator arranged for horizontal movement, means for interconnecting said actuator and contactor to translate horizontal movement of said actuator into vertical movement of said contactor, said means including a cylinder slidably but nonrotatably connected to said actuator, and rotatably but nonslidably connected to said contactor, the cylinder being arranged to rotate on a vertical axis, a stationary frame, spiral slot and pin means normally interconnecting the cylinder and frame in such a way that as the cylinder slides vertically it is normally required to rotate on a vertical axis, and as it rotates it normally slides vertically, latch means for normally restraining the pin means from vertical movement and thus for normally restraining the cylinder from sliding vertically except as it is rotated by the actuator, and circuit responsive means for releasing said latch means to free the pin means and thus free the cylinder to slide vertically without rotating and thus without causing or requiring the actuator to rotate.

2. In a circuit breaker having a contactor arranged for vertical movement and an actuator arranged for horizontal movement, means for interconnecting said actuator and contactor to translate horizontal movement of said actuator into vertical movement of said contactor, said means including a cylinder slidably but nonrotatably connected to said actuator, and rotatably but nonslidably connected to said contactor, the cylinder being arranged to rotate on a vertical axis, a stationary frame, spiral slot and pin means normally interconnecting the cylinder and frame in such a way that as the cylinder slides vertically it is normally required to rotate on a vertical axis, and as it rotates it normally slides vertically, latch means for normally restraining the pin means from vertical movement and thus for normally restraining the cylinder from sliding vertically except as it is rotated by the actuator, and circuit responsive means for releasing said latch means to free the pin means and thus free the cylinder to slide vertically without rotating and thus without causing or requiring the actuator to rotate, the slot and pin means including two pins on opposite sides of the cylinder, said frame and cylinder having slots on opposite sides of said cylinder for said pins, the latch means engaging both of such pins.

3. In a circuit breaker having a contactor arranged for vertical movement and an actuator arranged for horizontal movement, means for interconnecting said actuator and contactor to translate horizontal movement of said actuator into vertical movement of said contactor, said means including a cylinder slidably but nonrotatably connected to said actuator, and rotatably but nonslidably connected to said contactor, the cylinder being arranged to rotate on a vertical axis, a stationary frame, spiral slot and pin means normally interconnecting the cylinder and frame in such a way that as the cylinder slides vertically it is normally required to rotate on a vertical axis, and as it rotates it normally slides vertically, latch means for normally restraining the pin means from vertical movement and thus for normally restraining the cylinder from sliding vertically except as it is rotated by the actuator, and circuit responsive means for releasing said latch means to free the pin means and thus free the cylinder to slide vertically without rotating and thus without causing or requiring the actuator to rotate, the slot and pin means including two pins on opposite sides of the cylinder, said frame and cylinder having slots on opposite sides of said cylinder for said pins, the latch means engaging both of such pins, the slots of the frame extending vertically and those of the cylinder extending spirally.

4. In a circuit breaker having a contactor arranged for vertical movement and an actuator arranged for horizontal movement, means for interconnecting said actuator and contactor to translate horizontal movement of said actuator into vertical movement of said contactor, said means including a cylinder slidably but nonrotatably connected to said actuator, and rotatably but nonslidably connected to said contactor, the cylinder being arranged to rotate on a vertical axis, a stationary frame, spiral slot and pin means normally interconnecting the cylinder and frame in such a way that as the cylinder slides vertically it is normally required to rotate on a vertical axis, and as it rotates it normally slides vertically, latch means for normally restraining the pin means from vertical movement and thus for normally restraining the cylinder from sliding vertically except as it is rotated by the actuator, and circuit responsive means for releasing said latch means to free the pin means and thus free the cylinder to slide vertically without rotating and thus without causing or requiring the actuator to rotate, the slot and pin means including two pins on opposite sides of the cylinder, said frame and cylinder having slots on opposite sides of said cylinder for said pins, the latch means engaging both of such pins, the slots of the frame extending vertically and those of the cylinder extending spirally, the pins normally being held immovable in the frame slots and thus camming the cylinder to move vertically as it rotates by engagement with the spiral slots of the cylinder.

5. A control arrangement for a circuit breaker comprising a stationary frame having a vertical slot therein, a spirally slotted cylinder adjacent said frame, a pin having portions in the slot of the frame and in the slot of the cylinder, automatically releasable latch means normally holding said pin stationary in the frame slot to form a guide for determining motion of said cylinder whereby the latter is then required to rotate on its axis as it slides vertically and is then required to slide vertically as it rotates on its axis, and automatic means for releasing said latch means to free said pin to be movable vertically in said frame slot whereby the cylinder is then free to move vertically without rotating.

6. A control arrangement for a circuit breaker comprising a stationary frame having a vertical slot therein, a spirally slotted cylinder adjacent said frame, a pin having portions in the slot of the frame and in the slot of the cylinder, automatically releasable latch means normally holding said pin stationary in the frame slot to form a guide for determining motion of said cylinder whereby the latter is then required to rotate on its axis as it slides vertically and is then required to slide vertically as it rotates on its axis, and automatic means for releasing said latch means to free said pin to be movable vertically in said frame slot whereby the cylinder is then free to move vertically without rotating, in combination with a spring biasing said cylinder to move vertically and an actuator for rotating said cylinder.

7. A control arrangement for a circuit breaker comprising a stationary frame having a vertical slot therein, a spirally slotted cylinder adjacent said frame, a pin having portions in the slot of the frame and in the slot of the cylinder, automatically releasable latch means normally holding said pin stationary in the frame slot to form a guide for determining motion of said cylinder whereby the latter is then required to rotate on its axis as it slides vertically and is then required to slide vertically as it rotates on its axis, and automatic means for releasing said latch means to free said pin to be movable vertically in said frame slot whereby the cylinder is then free to move vertically without rotating, in combination with a spring biasing said cylinder to move vertically and an actuator for rotating said cylinder, and a contactor operatively connected to said cylinder and movable thereby when the cylinder moves vertically.

8. A control arrangement for a circuit breaker comprising a stationary frame having parallel spaced sides formed with vertical slots therein, a cylinder between said sides and having opposed spiral slots, pins having portions in the slots of the frame and in the slots of the cylinder, automatically releasable latch means normally holding said pins stationary in the frame slots to form guides for determining motion of said cylinder whereby the latter is then required to rotate on its axis as it slides vertically and is then required to slide vertically as it rotates on its axis, and automatic means for releasing said latch means to free said pins to be movable vertically in said frame slots whereby the cylinder is then free to move vertically without rotating.

9. A control arrangement for a circuit breaker comprising a stationary frame having parallel spaced sides formed with vertical slots therein, a cylinder between said sides and having opposed spiral slots, pins having portions in the slots of the frame and in the slots of the cylinder, automatically releasable latch means normally holding said pins stationary in the frame slots to form guides for determining motion of said cylinder whereby the latter is then required to rotate on its axis as it slides vertically and is then required to slide vertically as it rotates on its axis, and automatic means for releasing said latch means to free said pins to be movable vertically in said frame slots whereby the cylinder is then free to move vertically without rotating, in combination with a spring biasing said cylinder to move vertically and a handle for rotating said cylinder.

10. A control arrangement for a circuit breaker comprising a stationary frame having parallel spaced sides formed with vertical slots therein, a cylinder between said sides and having opposed spiral slots, pins having portions in the slots of the frame and in the slots of the cylinder, automatically releasable latch means normally holding said pins stationary in the frame slots to form guides for determining motion of said cylinder whereby the latter is then required to rotate on its axis as it slides vertically and is then required to slide vertically as it rotates on its axis, and automatic means for releasing said latch means to free said pins to be movable vertically in said frame slots whereby the cylinder is then free to move vertically without rotating, in combination with a spring biasing said cylinder to move vertically and a handle for rotating said cylinder, and a contactor operatively connected to said cylinder and movable thereby when the cylinder moves vertically.

ELWOOD T. PLATZ.

REFERENCES CITED

The following references are of record in the file of this patent:

UNITED STATES PATENTS

| Number | Name | Date |
|---|---|---|
| 1,761,117 | Getchell | June 3, 1930 |
| 1,884,133 | Nero | Oct. 25, 1932 |
| 1,957,273 | Langfritz | May 1, 1934 |
| 2,067,792 | Seaman | Jan. 12, 1937 |
| 2,203,131 | Coy | June 4, 1940 |
| 2,210,793 | Butler | Aug. 6, 1940 |
| 2,270,150 | Taylor | Jan. 13, 1942 |
| 2,289,643 | Furnas et al. | July 14, 1942 |
| 2,290,495 | Sandin et al. | July 21, 1942 |
| 2,354,157 | Swingle | July 18, 1944 |
| 2,360,922 | Wilckens | Oct. 24, 1944 |
| 2,390,365 | Goff | Dec. 4, 1945 |

FOREIGN PATENTS

| Number | Country | Date |
|---|---|---|
| 653,425 | France | Mar. 21, 1929 |